United States Patent [19]

Anderson

[11] Patent Number: 5,029,895
[45] Date of Patent: Jul. 9, 1991

[54] OUTRIGGER-MOUNTED AXLE ASSEMBLY

[75] Inventor: Thomas M. Anderson, Forest Lake, Minn.

[73] Assignee: Schwing America, Inc., St. Paul, Minn.

[21] Appl. No.: 596,574

[22] Filed: Oct. 11, 1990

Related U.S. Application Data

[63] Continuation of Ser. No. 378,454, Jul. 11, 1989, abandoned, which is a continuation of Ser. No. 220,004, Jul. 15, 1988, abandoned.

[51] Int. Cl.⁵ ............................................ B62B 9/02
[52] U.S. Cl. ......................... 280/764.1; 212/189; 280/43.23; 280/43.24; 280/763.1; 280/767
[58] Field of Search .............. 280/763.1, 764.1, 765.1, 280/766.1, 767, 43.23, 43.24; 212/189

[56] References Cited

U.S. PATENT DOCUMENTS

| | | | |
|---|---|---|---|
| 3,112,100 | 11/1963 | Prichard | 259/161 |
| 3,161,418 | 12/1964 | Brennan et al. | 280/81 |
| 3,191,961 | 6/1966 | Brennan et al. | 280/81 |
| 3,246,884 | 4/1966 | Prichard et al. | 259/161 |
| 3,317,193 | 5/1967 | Buelow et al. | 259/161 |
| 3,479,042 | 11/1969 | Duecy | 280/81 |
| 3,610,653 | 10/1971 | Derrwalt | 280/81 |
| 3,685,853 | 8/1972 | Goldsmith | 280/81 R |
| 3,704,896 | 12/1972 | Buelow | 280/81 A |
| 3,912,293 | 10/1975 | Harbers | 280/81 R |
| 4,241,803 | 12/1980 | Lauber | 280/765.1 |
| 4,314,709 | 2/1982 | Silbernagel | 280/81 A |
| 4,418,713 | 12/1983 | Schlecht | 280/766.1 |
| 4,501,437 | 2/1985 | Becker | 280/704 |
| 4,555,031 | 11/1985 | Blase et al. | 280/764.1 |

FOREIGN PATENT DOCUMENTS 497338 12/1938 United Kingdom ............. 280/764.1

Primary Examiner—Andres Kashnikow
Assistant Examiner—Eric Culbreth
Attorney, Agent, or Firm—Kinney & Lange

[57] ABSTRACT

A load transfer assembly is used on a vehicle which has one or more outriggers. The load transfer assembly consists of an axle assembly mounted proximate the outer end of at least one of the outriggers. The axle assembly bears at least one ground-engaging wheel and is selectively pivotable between a first axle support and transport position, with the wheel in engagement with the ground (outrigger retracted), and a second axle storage position, with the wheel out of engagement with the ground (outrigger extended).

17 Claims, 3 Drawing Sheets

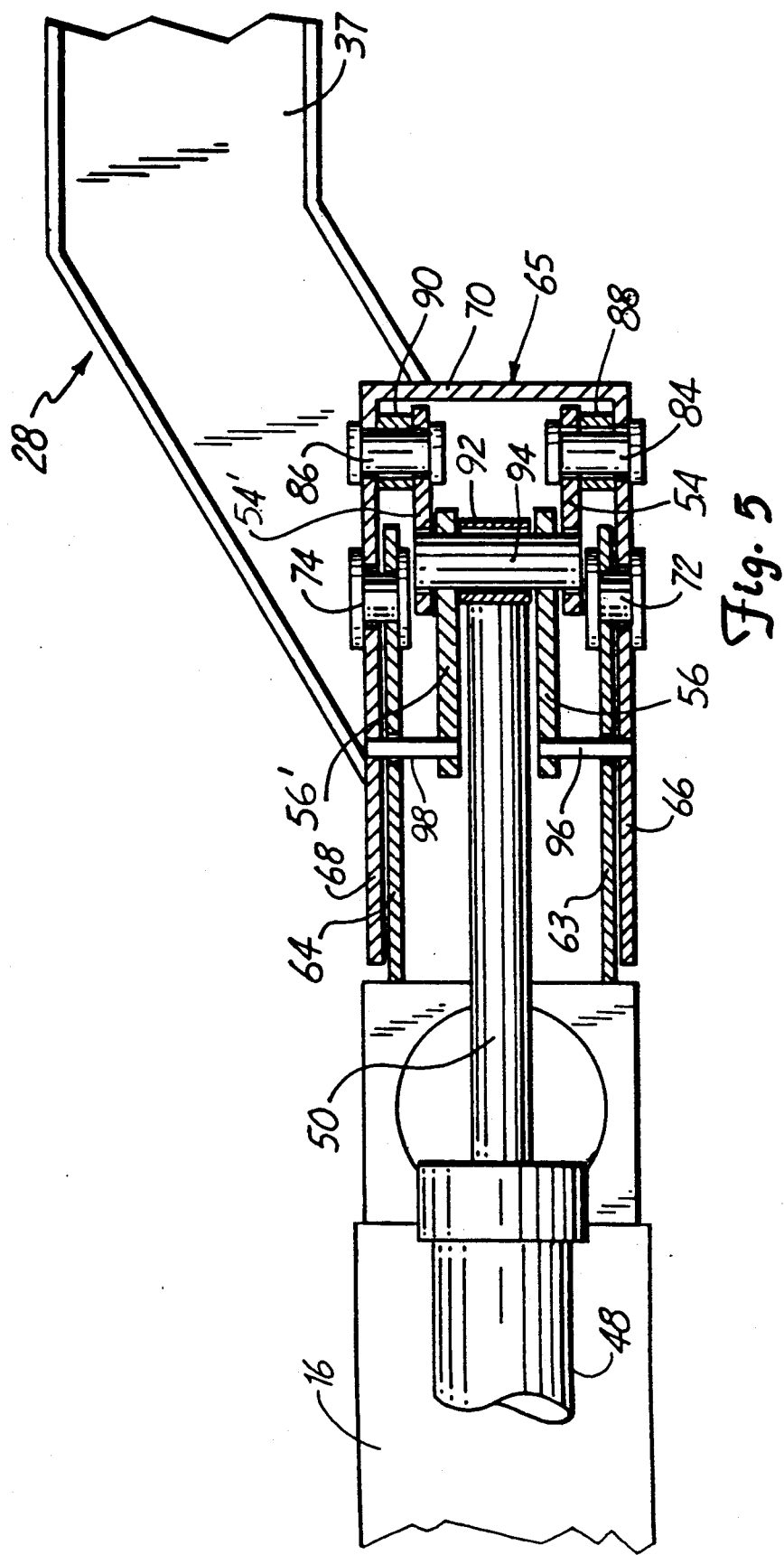

OUTRIGGER-MOUNTED AXLE ASSEMBLY

This is a continuation of application Ser. No. 378,454, filed July 11, 1989, now abandoned, which is a continuation of Ser. No. 220,004, filed July 15, 1988, now abandoned.

BACKGROUND OF THE INVENTION

1. Field of the Invention

The present invention relates to a load transfer assembly for vehicles which have one or more outriggers. More specifically, the invention relates to an axle assembly mounted proximate the outer end of at least one of the outriggers.

2. Description of the Prior Art

Numerous forms of auxiliary axles or load support dollies have been utilized in combination with vehicles to partially support the weight of the vehicle and its load. Government highway or bridge weight regulations often require a specific number of axles when a vehicle's weight exceeds a certain limit. To compensate for such regulations for vehicles whose weights vary greatly depending upon whether they are loaded or not, auxiliary trailing or "tag" axles have been utilized adjacent the rearward ends of such vehicles to provide a load-carrying additional axle.

Some vehicles are equipped with "outriggers" for stability in use. For example, various truck-mounted cranes, ladder or snorkel fire engines, and other large vehicles have been provided with outriggers that slide out or pivot out laterally from the vehicle frame when the vehicle has been parked for use of the equipment mounted thereon. Because such vehicles are often large and relatively heavy, a load transfer assembly, or "tag" axle, is also desirable on such vehicles. Another example of such a vehicle is one which carries concrete pump and placing boom. Since the outriggers on this type of vehicle are often foldable or retractable for transportation, it is desirable to have the tag axle mounted in such a way that it does not impede the movement of the outriggers or the equipment on the vehicle.

SUMMARY OF THE INVENTION

The present invention provides an axle assembly to selectively provide additional weight support for use on a vehicle which utilizes outriggers for stability. Additionally, the axle assembly of the present invention is mounted in such a manner that it will not impede the movement of the outriggers.

The outriggers on a vehicle are selectively movable between a first outrigger transport position (where the outriggers are retracted or folded against the vehicle), and a second outrigger stabilizer position (wherein the outriggers are extended or folded out from the vehicle so that an outer end of the outrigger is spaced from the vehicle) with a portion of the outer end of the outrigger in operable engagement with the ground to stabilize the vehicle in a desired position. A load transfer assembly ("tag" axle) comprises an axle assembly mounted proximate the outer end of at least one of the outriggers. Each axle assembly bears at least one ground-engaging wheel, and each axle assembly is selectively pivotable between a first axle support and transport position, wherein the wheel is in engagement with the ground, and a second axle storage position, wherein the wheel is moved up out of engagement with the ground.

BRIEF DESCRIPTION OF THE DRAWINGS

FIG. 5 is an enlarged top plan view of the pivoting portions of the axle assembly of the present invention, with some components shown in section.

DETAILED DESCRIPTION OF THE PREFERRED EMBODIMENTS

Figure 1:
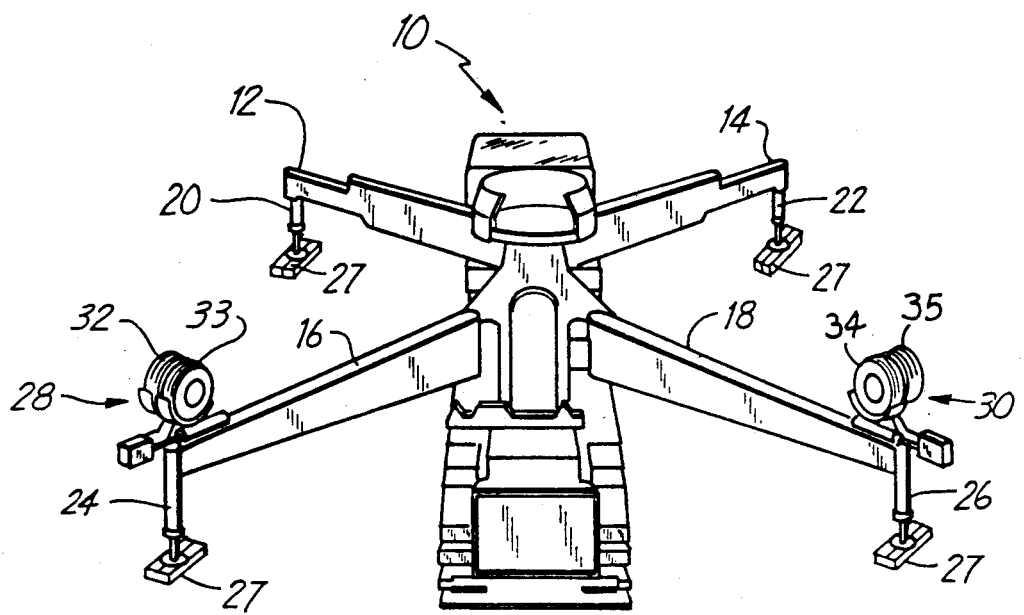
FIG. 1 is a rear perspective view of a vehicle with each of its outriggers in its extended stabilizer position and with the axle assemblies of the present invention in their axle storage position.

FIG. 1 shows a rear perspective view of vehicle 10 (a concrete pump and placing boom truck, with the boom not shown) which has a pair of leading outriggers 12 and 14, and a pair of trailing outriggers 16 and 18 for stability. In FIG. 1, each of the outriggers 12, 14, 16, and 18 is in an extended outrigger stabilizer position. Each outrigger 12, 14, 16, and 18 has an extensible leg 20, 22, 24, and 26, respectively, adjacent an outer end thereof. In the outrigger stabilizer position, outriggers 12, 14, 16, and 18 are folded out from vehicle 10 so that legs 20, 22, 24, and 26 are spaced from vehicle 10, and the legs are moved into operable engagement with the ground to stabilize vehicle 10. Legs 20 and 22, mounted proximate outer ends of leading outriggers 12 and 14, respectively, are each in operable engagement with the ground at a point towards a leading end of vehicle 10. Legs 24 and 26, mounted proximate outer ends of trailing outriggers 16 and 18, respectively, are each in operable engagement with the ground at a point towards a trailing end of vehicle 10. In use, each leg is extended hydraulically to engage the ground or rest on a suitable support surface, such as timbers 27.

Axle assemblies 28 and 30, which include wheels 32, 33, 34, and 35, are mounted to trailing outriggers 16 and 18 proximate the outer ends of trailing outriggers 16 and 18, respectively. When the outriggers 16 and 18 are extended to stabilize the vehicle 10, axle assemblies 28 and 30, as shown in FIG. 1, are pivoted to an axle storage position above the outer ends of their outriggers, with their wheels 32, 33, 34, and 35 moved up out of engagement with the ground.

Figure 2:
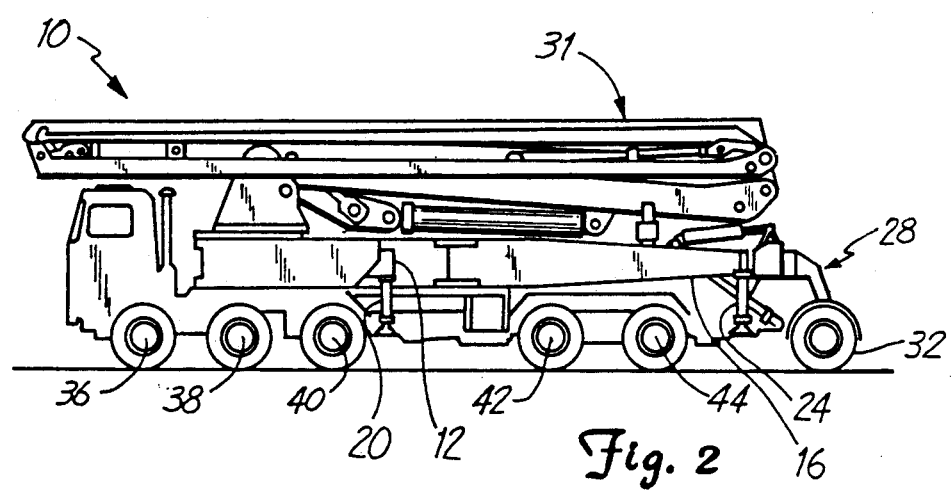
FIG. 2 is a side elevational view of the vehicle of FIG. 1 with the outriggers in their retracted transport position and with the axle assemblies in their axle support and transport position.

FIG. 2 shows a side elevational view of vehicle 10. In FIG. 2, outriggers 12, 14, 16, and 18 are in an outrigger transport position (outriggers 14 and 18 are not shown). To reach this position, the legs are retracted upwardly and the outriggers are retracted or folded against the vehicle sufficiently to permit the vehicle to be driven. In FIG. 2, leading outrigger 12 and trailing outrigger 16 are shown, together with their legs 20 and 24, folded or retracted against the vehicle 10 for transportation. The vehicle 10 shown in FIG. 2 also has a foldable concrete placing boom 31 mounted thereon.

Additionally, in FIG. 2, axle assembly 28 is shown pivoted into an axle support and transport position in which wheels 32 and 33 (wheel 33 is behind wheel 32 and thus not shown) are in engagement with the ground. In the axle support and transport position, part of the weight of vehicle 10 and its load, which is normally borne by the wheels of axles 36, 38, 40, 42, and 44, is transferred to axle assembly 28. The support provided to the vehicle by axle assembly 28 is through outrigger 16 to the vehicle frame, outrigger 16 now providing support for the vehicle both during transport and use.

Figure 3:
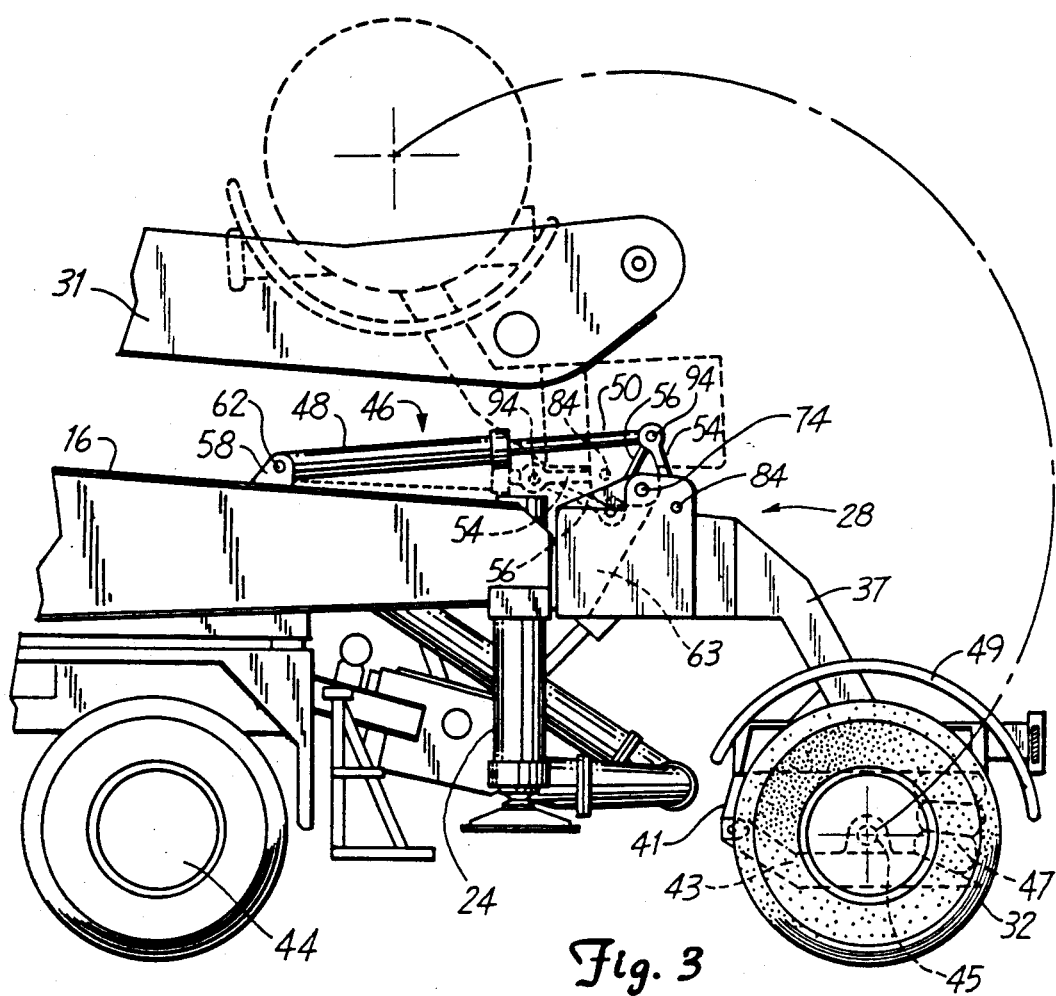
FIG. 3 is a side elevational view of the axle assembly of the present invention.

FIG. 3 shows an enlarged side view of axle assembly 28. For transport, the outrigger 16 has been folded against the side of the vehicle 10 and its leg 24 retracted from the ground. The axle assembly 28 has been pivoted into its axle support and transport position to provide additional vehicle support during vehicle movement. In FIG. 3, the relative position of the axle assembly 28, when moved to its axle storage position, is shown in phantom. As seen in FIG. 3, axle assembly 28 is pivotally mounted to the outrigger 16 proximate the outer end thereof.

Each axle assembly includes a main frame portion 37 which is pivotally mounted, at an upper end, to its outrigger and which has a longitudinal frame portion 39 fixed to its lower end. Frame portion 39 extends between the wheels of the axle assembly (e.g., wheels 32 and 33 of axle assembly 28). An ear 41 extends down from a leading end of the frame portion 39. Pivotally mounted to the ear 41 (on a lateral axis) is a wheel carriage frame portion 43, that extends longitudinally under the frame portion 39. An axle 45 for the wheels 32 and 33 is borne by the carriage frame portion 43, as seen in FIG. 3. A compressible air bag 47 is mounted between the trailing ends of the frame portion 39 and 43 to hold them in a spaced apart relation and provide the wheels 32 and 33 with some shock absorbing capacity in use. Preferably, fenders 49 are provided over each wheel on the axle assembly.

In one preferred embodiment, hydraulic hinge 46 is used to mount main frame portion 37 of axle assembly 28 to trailing outrigger 16. Hydraulic hinge 46 is used for pivoting axle assembly 28 between the axle support and transport position, shown in solid lines in FIG. 3, and the axle storage position, shown in phantom in FIG. 3.

Hydraulic hinge 46 includes a hydraulic actuator which has a cylinder portion 48 and an extensible piston portion 50. The leading end of cylinder 48 is pivotally mounted to trailing outrigger 16 at pivot pin 52. The piston 50 extends out of the trailing end of the cylinder 48, and has its distal end pivotally mounted relative to the frame portion 37 of the axle assembly 28 through pivoting tie rods 56 and 54, as discussed in greater detail below.

Figure 4:
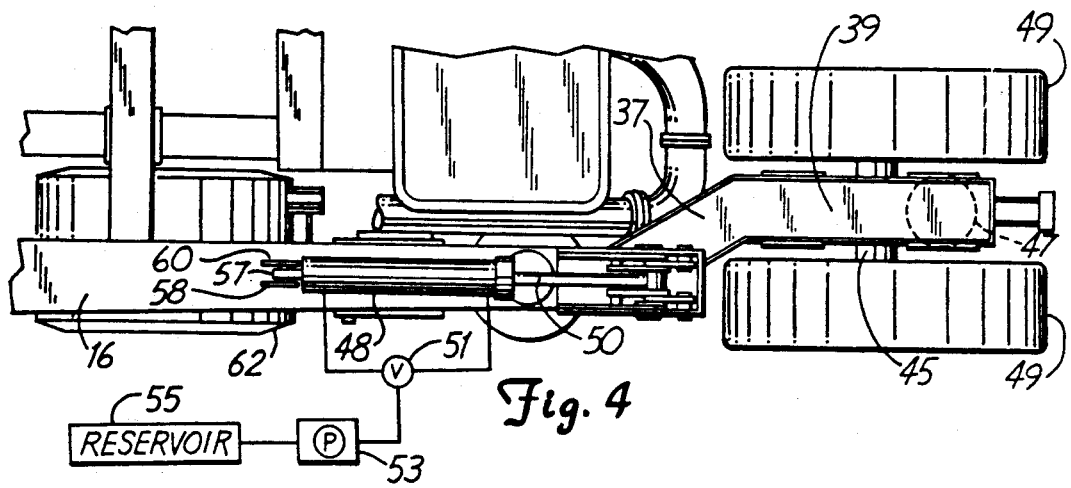
FIG. 4 is a top plan view of the axle assembly of the present invention.

FIG. 4 is a top plan view of axle assembly 28 as seen in FIG. 3. FIG. 4 schematically shows a valve 51, a fluid pressurizer 53 and a fluid reservoir 55 which allow for operation of the hydraulic actuator, and thus selective extension and retraction of piston portion 50 with respect to cylinder portion 48, as is well known in the art. Extension of piston 50 causes axle assembly 28 to pivot into the axle support and transport position where wheels 32 and 33 bear part of the weight and load of vehicle 10, as shown in FIGS. 2, 3, and 4. Retraction of piston portion 50 causes axle assembly 28 to pivot into the axle storage position as shown in FIG. 1 and as seen in phantom in FIG. 3.

At its leading end, the hydraulic cylinder 48 has an ear 57, which fits between a pair of outrigger ears 58 and 60. The outrigger ears 58 and 60 are secured to trailing outrigger 16 at a point spaced from the outer end of trailing outrigger 16, and are provided with generally horizontally aligned apertures. These apertures are aligned with an aperture in cylinder ear 57 for acceptance of a pivot pin 62. This allows cylinder 48 to pivot vertically with respect to trailing outrigger 16 about a lateral axis defined by pivot pin 62 relative to the outrigger 16 and vehicle 10.

FIG. 5 shows a further enlarged top plan view of the pivotal connection components between piston portion 50 and axle assembly 28. Two horizontally aligned mounting ears 63 and 64 extend rearwardly from the outer end of outrigger 16. At its upper end, the main frame portion 37 of the axle assembly 28 has a U-shaped mounting bracket 65 secured thereto. The mounting bracket has parallel, longitudinally-extending side walls 66 and 68, and a lateral end wall 70. Mounting ears 63 and 64 fit inside side walls 66 and 68 of mounting bracket 65 and extended parallel thereto. Wall 66 of mounting bracket 65 is provided with an aperture which is substantially laterally aligned with an aperture in mounting ear 63, and these apertures are aligned for accepting lateral pivot pin 72.

Mounting ear 64 and wall 68 of mounting bracket 65 are also provided with substantially laterally aligned apertures for acceptance of pivot pin 74, which is axially aligned with pivot pin 72. This arrangement allows mounting bracket 65 to pivot with respect to mounting ears 63 of the outrigger on a lateral axis defined by pivot pins 72 and 74.

The side walls 66 and 68 of the mounting bracket 65 have another pair of axially aligned apertures located rearwardly of the apertures holding pivot pins 72 and 74. These apertures are provided to allow pivotal connections between the mounting bracket 65 and the parallel tie rods 54, 54' (seen in FIG. 5). The tie rods 54, 54' are of equal length and at a first outer end thereof, each tie rod 54, 54' has an aperture which is aligned with the rearward apertures of the mounting bracket 65. A pivot pin 84 is mounted between side wall 66 and tie rod 54, while a pivot pin 86 is mounted between side wall 68 and tie rod 54'. Because the tie rods and side walls are not side by side, spacers 88 and 90 are provided therebetween along the pivot pins 84 and 86, respectively. As seen, the pivot pins 84 and 86 are axially aligned.

The spacer 88 maintains tie rod 54 a desired distance from wall 66 of mounting bracket 65 such that tie rod 54 is pivotable with respect to wall 66 about pivot pin 84 and does not interfere with pivot pin 72 or mounting ear 63. Similarly, the spacer 90 maintains tie rod 54' a desired distance from wall 68 so that tie rod 54' is pivotable with respect to wall 68 about pivot pin 86 and does not interfere with pivot pin 74 or mounting ear 64.

At its distal end, piston portion 50 has a lateral tube 92 fixed thereto, and adapted for pivotal reception of a lateral pivot pin 94. At a second inner end thereof, each tie rod 54, 54' has an aperture adapted for pivotal reception of pivot pin 94, as seen in FIG. 5. The tie rods 54, 54' are mounted about the pivot pin 94 proximate its outer ends and spaced laterally from the lateral tube 92 of the piston portion 50, with portions of the tie rods 56, 56' therebetween.

The tie rods 56, 56' are also equal in length and extend parallel to one another, as seen in FIG. 5. At a first upper end thereof, each tie rod 56, 56' has an aperture adapted for acceptance of pivot pin 94. The pivotal connection of piston portion 50, tie rods 54, 54', and tie rods 56, 56' above pivot pin 94 thus allows those components to pivot relative to one another.

At a second lower end thereof, each tie rod 56, 56' has an aperture adapted for acceptance of pivot pins 96 and 98, respectively. The pivot pins 96 and 98 are, in turn, also retained in axially aligned apertures in the mounting ears 63 and 64 of the outrigger 16, as seen in FIG. 5.

The arrangement of pivot pins 72, 74, 84, 86, 94, 96, and 98 provides the pivotal connection between outrigger 16 and axle assembly 28. In operation, the laterally extending and parallel pivot pins work as follows: when piston portion 50 is extended from cylinder portion 48, pivot pin 94 extends upwardly and rearwardly from mounting ears 63 and 64. Tie rods 56, 56' pivot upwardly and rearwardly with respect to pivot pins 96 and 98 on the mounting ears 63 and 64. Tie rods 54 and 54' also pivot rearwardly. The axis defined by pivot pins 72 and 74 is the main pivoting axis for the axle assembly 28. As the piston portion 50 is extended, mounting bracket 65 pivots downwardly about the axis of pivot pins 72 and 74. Since mounting bracket 65 is pivotally connected to axle assembly 28, extension of piston portion 50 from cylinder portion 48 causes axle assembly 28 to pivot downwardly and rearwardly. When axle assembly 28 is pivoted downwardly far enough (i.e., when piston portion 50 is extended far enough), the wheels 32 and 33 engage the ground. Axle assembly 28 is then in a support position capable of bearing part of the weight and load of vehicle 10.

Also, once wheels 32 and 33 have come into engagement with the ground, piston portion 50 can be further extended with respect to cylinder portion 48 (by varying the pressure in cylinder portion 48 via valve 53) so that axle assembly 28 bears more of the weight and load of vehicle 10.

Conversely, retraction of piston portion 50 into cylinder portion 48 causes pivot pin 94 to move forwardly with respect to mounting ears 63 and 64. This, in turn, causes both tie rods 56 and 56' to pivot forwardly with respect to pivot pins 96 and 98. Also, this causes tie rods 54 and 54' to pivot forwardly. This action causes mounting bracket 65 to pivot upwardly about the main pivot axis defined by pivot pins 72 and 74. Consequently, axle assembly 28 pivots upwardly with respect to mounting ears 63 and 64. When piston portion 50 is fully retracted with respect to cylinder portion 48, axle assembly 28 has pivoted approximately 180° (as shown in phantom in FIG. 3) about the main axis defined by pivot pins 72 and 74. Also, when piston portion 50 is fully retracted with respect to cylinder portion 48, wheels 32 and 33 are moved up out of engagement with the ground and axle assembly 28 is in a storage position where it does not bear any of the load or weight of vehicle 10.

Since piston portion 50 is selectively extendable from cylinder portion 48, as indicated schematically in FIG. 4, axle assembly 28 can maintain any position within the approximately 180° arc shown in FIG. 3 inclusive of the support and transport position shown in FIG. 3 and the storage position shown in phantom in FIG. 3.

This invention provides a useful means and arrangement for conveniently mounting a tag axle on the outer end of an outrigger on a vehicle which uses outriggers for stability. As shown, the tag axle can be used to bear varying portions of the vehicle's load when the outriggers are folded or retracted into the vehicle for transportation. Additionally, when the outriggers are extended to give support to the vehicle, the tag axle or axle assembly is pivoted into a storage position where it does not interfere with the vehicle's operation or the operation of the equipment mounted on the vehicle.

Although the present invention has been described with reference to preferred embodiments, workers skilled in the art will recognize that changes may be made in form and detail without departing from the spirit and scope of the invention. For example, an axle assembly could be mounted on each outrigger of a vehicle, rather than just the two trailing outriggers.

What is claimed is:

1. In combination with a concrete pump vehicle supported by a plurality of ground engaging wheels, the vehicle having one or more elongated outriggers whose primary purpose are to support and stabilize the vehicle when the vehicle is stationary, each outrigger having an extensible leg mounted adjacent an outer end of the outrigger, each outrigger being selectively movable between a first outrigger transport position to accommodate vehicle movement, wherein the outrigger is retracted or folded rearwardly against the vehicle, and a second outrigger stabilizer position when the vehicle is stationary, wherein the outrigger is extended or unfolded generally laterally outwardly from the vehicle so that the leg of the outrigger is spaced from the vehicle, the improvement being a load transfer assembly which comprises:

an axle assembly mounted to and extending from the outer end of at least one of the outriggers, each axle assembly bearing a pair of ground engaging wheels and each axle-assembly being selectively pivotable about a lateral axis with respect to a longitudinal length of the outrigger between a first axle support and transport position wherein the wheels are in engagement with the ground to aid in supporting the vehicle during movement thereof, and a second axle storage position wherein the wheels are rotationally translated approximately 180° about the lateral axis with respect to the longitudinal length of the outrigger such that the wheels are moved up out of engagement with the ground when the outrigger is in the outrigger stabilizer position and the wheels and axle assembly are positioned over the outrigger and its extensible leg, and wherein the lateral axis bout which the axle assembly pivots approximately 180° is above the outrigger.

2. The load transfer assembly of claim 1 wherein each axle assembly is in the first axle support and transport position when the outriggers to which it is mounted is in the first outrigger transport position.

3. The load transfer assembly of claim 1 wherein each axle assembly is in the second axle storage position when the outrigger to which it is mounted is in the second outrigger stabilizer position.

4. The load transfer assembly of claim 1, and further comprising:

hydraulic actuator means for pivoting the axle assembly between the first axle support and transport position and the second axle storage position.

5. The load transfer assembly of claim 4 wherein the hydraulic actuator means further comprises:

a cylinder portion pivotally mounted to the outrigger to extend longitudinally therealong from a point spaced from the leg of the outrigger; and an extensible piston portion which is selectively extendable from the cylinder portion, the extensible piston portion being pivotally mounted to the axle assembly.

6. The load transfer assembly of claim 5 wherein extension of the hydraulic actuator means causes the axle assembly to pivot toward its first axle support and transport position.

7. The load transfer assembly of claim 6 wherein extension of the hydraulic actuator means is adjustable so that varying amounts of the load may be transferred to the axle assembly when the axle assembly is in the first axle support and transport position.

8. The load transfer assembly of claim 1 wherein the lateral axis about which the axle assembly pivots approximately 180° is fixed with respect to the outrigger.

9. A supplementary concrete pump vehicle transport support assembly comprising:

a pair of elongated stabilizer outriggers mounted with respect to the vehicle, each outrigger having an extensible leg mounted adjacent an outer end of the outrigger, each outrigger being selectively movable between a first outrigger transport position to accommodate vehicle movement, wherein the outrigger is retracted or folded rearwardly against the vehicle proximate a trailing portion of the vehicle, and a second outrigger stabilizer position where the vehicle is stationary, wherein the outriggers are extended or unfolded generally laterally outwardly from the vehicle so that the legs of the outriggers are spaced from the vehicle such that, when extended, the legs are in operable engagement with the ground to support and stabilize the vehicle in a desired stationary position;

an axle assembly mounted to and extending form the outer end of at least one of the outriggers, each axle assembly bearing a pair of ground engaging wheels and each axle assembly being selectively movable between a first axle support and transport position wherein the wheels are in engagement with the ground to aid in supporting the vehicle during movement thereof, and a second axle storage position wherein the wheels are rotationally translated approximately 180° about a lateral axis with respect to the longitudinal length of the outrigger such that the wheels are moved up out of engagement with the ground when the outrigger is in the outrigger stabilizer position and the wheels and axle assembly are positioned over the outrigger and its extensible leg, and wherein the lateral axis about which the axle assembly pivots approximately 180° is above the outrigger.

10. The support assembly of claim 9 wherein each axle assembly is in the first axle support and transport position when the outrigger to which it is mounted is in the first outrigger transport position.

11. The support assembly of claim 9 wherein each axle assembly is in the second axle storage position when the outrigger to which it is mounted is in the second outrigger stabilizer position.

12. The support assembly of claim 9, wherein the axle assembly further comprises:

hydraulic actuator means for pivoting the axle assembly between the first axle support and transport position and the second axle storage position.

13. The support assembly of claim 12 wherein the hydraulic actuator means further comprises:

a cylinder portion pivotally mounted to the outrigger to extend longitudinally therealong from a point spaced from the leg of the outrigger; and an extensible piston portion which is selectively extendible from the cylinder portion, the extensible piston portion being pivotally mounted to the axle assembly.

14. The support assembly of claim 13 wherein extension of the hydraulic actuator means causes the axle assembly to pivot toward its first axle support and transport position.

15. The support assembly of claim 14 wherein extension of the hydraulic actuator means is adjustable so that varying amounts of the load may be transferred to the axle assembly when the axle assembly is in the first axle support and transport position.

16. The support assembly of claim 9 wherein the two wheels of each axle assembly are mounted on a common axis on opposite lateral sides of the axle assembly, and wherein an outer portion of the axle assembly which bears the common axis is offset laterally inwardly toward the vehicle so that a laterally outermost wheel is generally aligned longitudinally directly behind the outrigger when the outrigger is in its first transport position and the axle assembly is in its first axle support and transport position.

17. The support assembly of claim 9 wherein the lateral axis about which the axle assembly pivots approximately 180° is fixed with respect to the outrigger.

* * * * *

UNITED STATES PATENT AND TRADEMARK OFFICE
CERTIFICATE OF CORRECTION

PATENT NO. : 5,029,895

DATED : July 9, 1991

INVENTOR(S) : Thomas M. Anderson

It is certified that error appears in the above-identified patent and that said Letters Patent is hereby corrected as shown below:

On the title page

In the References Cited section, under U.S. PATENT DOCUMENTS, delete:

"3,479,042    11/1969    Duecy . . . . . . 280/81"

and insert:

--3,479,049    11/1969    Duecy . . . . . 280/81--

Col. 6, line 42, delete "bout", insert --about--.

Signed and Sealed this

Twenty-fourth Day of November, 1992

Attest:

DOUGLAS B. COMER

*Attesting Officer*         Acting Commissioner of Patents and Trademarks